US008908743B2

(12) United States Patent
Badic et al.

(10) Patent No.: US 8,908,743 B2
(45) Date of Patent: Dec. 9, 2014

(54) RECEIVER WITH MULTI LAYER INTERFERENCE CANCELLATION

(71) Applicant: Intel Mobile Communications GmbH, Neubiberg (DE)

(72) Inventors: Biljana Badic, Duesseldorf (DE); Tobias Scholand, Muelheim (DE); Rajarajan Balraj, Duesseldorf (DE); Peter Jung, Duisburg (DE); Guido Bruck, Voerde (DE); Zijian Bai, Duisburg (DE); Stanislaus Iwelski, Cologne (DE)

(73) Assignee: Intel Mobile Communications GmbH, Neubiberg (DE)

( * ) Notice: Subject to any disclaimer, the term of this patent is extended or adjusted under 35 U.S.C. 154(b) by 98 days.

(21) Appl. No.: 13/627,504

(22) Filed: Sep. 26, 2012

(65) Prior Publication Data

US 2014/0086296 A1 Mar. 27, 2014

(51) Int. Cl.
*H04B 1/00* (2006.01)
(52) U.S. Cl.
USPC ........... 375/144; 375/148; 375/347; 375/348; 375/349
(58) Field of Classification Search
CPC ... H04L 27/2647; H04L 25/0204; H04L 1/06; H04L 2025/03414; H04L 5/0023; H04L 2025/03426; H04L 27/2697; H04L 27/2649; H04B 1/1027; H04B 1/109; H04B 17/0057; H04B 1/1036; H04B 17/005; H04B 15/00; H04B 15/02; H04B 1/0475; H04B 1/7103; H04B 1/715; H04B 2201/70702; H04B 7/0452; H04B 1/7097; H04B 1/71075; H04B 2001/1045; H04B 1/717072
USPC ......... 375/144, 148, 267, 285, 340, 346, 347, 375/349, 350; 455/63.1, 67.13, 296, 303
See application file for complete search history.

(56) References Cited

U.S. PATENT DOCUMENTS

| 7,813,453 | B2 * | 10/2010 | Khandekar et al. ........... 375/340 |
| 8,619,928 | B2 * | 12/2013 | Abrishamkar et al. ....... 375/350 |
| 8,660,217 | B2 * | 2/2014 | Choi et al. ................... 375/340 |
| 8,665,693 | B1 * | 3/2014 | Cheng et al. ................. 370/204 |
| 2006/0171483 | A1 * | 8/2006 | Jia et al. ....................... 375/267 |
| 2009/0274074 | A1 | 11/2009 | Astely |

(Continued)

OTHER PUBLICATIONS

Office Action dated Feb. 8, 2013 for U.S. Appl. No. 13/396,829.

(Continued)

*Primary Examiner* — Dac Ha
(74) *Attorney, Agent, or Firm* — Eschweiler & Associates, LLC

(57) ABSTRACT

A multi user receiver configured to receive a signal including multiple symbol streams assigned to various users is described. The multiple symbol streams include at least one first symbol stream assigned to a user of the multi user receiver and at least one second symbol stream assigned to another user, wherein a modulation alphabet applied for the at least one second symbol stream is unknown at the multi user receiver. The multi user receiver includes a symbol stream election unit configured to elect a symbol stream of the multiple symbol streams, an equalizer configured to provide an equalized symbol of the elected symbol stream, and a detector configured to generate a detected symbol from the equalized symbol on the basis of a constellation, wherein, if the second symbol stream is elected, the constellation is a mixed constellation including constellation points of at least two of multiple predefined modulation alphabets.

24 Claims, 8 Drawing Sheets

(56) References Cited

U.S. PATENT DOCUMENTS

| | | |
|---|---|---|
| 2010/0254476 A1 | 10/2010 | Li et al. |
| 2012/0051468 A1 | 3/2012 | Weitkemper et al. |
| 2012/0099638 A1* | 4/2012 | Wang .......................... 375/233 |
| 2013/0128940 A1* | 5/2013 | Mergen et al. ................ 375/227 |

OTHER PUBLICATIONS

3GPP, LTE; Evolved Universal Terrestrial radio Access (E-UTRA); Long Term Evolution (LTE) Physical Layer; General Description; ETSI TS 136 201 V8.3.0 (Apr. 2009).

3GPP, LTE; Evolved Universal Terrestrial Radio Access (E-UTRA); Long Term Evolution (LTE) Physical Layer; General Description; ETSI TS 136 201 V9.1.0 (Apr. 2010).

3GPP, LTE; Evolved Universal Terrestrial Radio Access (E-UTRA); Long Term Evolution (LTE) Physical Layer; General Description; ETSI TS 136 201 V10.0.0 (Jan. 2011).

J. Wang, et al.; "An Improved Soft-Output MMSE V-BLAST Detector"; International Conference on Communication Technology (CCT06) p. 1-4, Nov. 2006.

J. Duplicy, et al.; "MU-MIMO in LTE Systems", EURASIP Journal on Wireless Communications and Networking, vol. 2011, p. 1-13, 2011.

Y. Lomnitz, et al.; "Efficient Maximum Likelihood Detector for MIMO Systems with Small Number of Streams", Electronic Letters, vol. 43, No. 22, 2007 p. 1-3.

Z. Bai, et al.; "On MIMO With Successive Interference Cancellation Applied to UTRA LTE" in Proc of the 3rd International Symposium on Communications, Control and Signal Processing, Malta, Mar. 2008, p. 1009-1013.

3GPP TS 36.201, V8.3.0 (Mar. 2009), Release 8.

3GPP TSG-RAN WG4 #AdHoc1, Sophia Antipolis, France, Jan. 18-22, 2010, p. 1-7.

EUSIPCO 2011, 19th European Signal Processing Conference, Aug. 29-Sep. 2, 2011, Barcelona, Spain, p. 1-2.

U.S. Appl. No. 13/396,829, filed Feb. 15, 2012.

Final Office Action dated Sep. 6, 2013 for U.S. Appl. No. 13/396,829.

Office Action Dated Apr. 11, 2014 U.S. Appl. No. 13/396,829.

Notice of Allowance dated Sep. 30, 2014 for U.S. Appl. No. 13/396,829.

\* cited by examiner

RECEIVER WITH MULTI LAYER INTERFERENCE CANCELLATION

FIELD

The invention relates to the field of radio communications, and more particularly to the technique of transmitting and detecting signals in multiple-antenna transmission systems of radio networks, in particular cellular radio networks.

BACKGROUND

In radio communications systems multiple User Equipment (UEs) may share the same frequency and time resource such that mutual interference may occur. Receiver circuits and methods for detecting data performed by receiver circuits constantly have to be improved. In particular, it may be desirable to improve the reception quality and performance of mobile communications receivers in Multi-user multiple input multiple output systems. For these and further reasons there is a need for the present invention.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
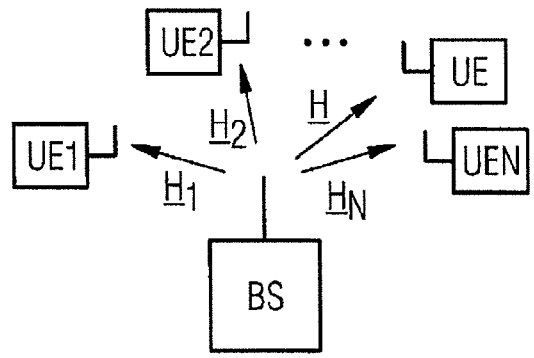
FIG. 1 schematically illustrates a configuration of a MIMO system.

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

In the following, various methods and receivers are described separately or with reference to each other. It is understood that comments made in connection with a described method may also hold true for a corresponding receiver configured to perform the method and vice versa. For example, if a specific method step is described, a corresponding receiver may include a unit to perform the described method step, even if such a unit is not explicitly described or illustrated in the figures.

The methods and receivers described herein may be based on or may support arbitrary (in particular digital) modulation schemes for modulating data. For example, symbols of a received symbol stream may be modulated according to a Quadrature Amplitude Modulation (QAM) modulation scheme, a Binary Phase Shift Keying (BPSK) modulation scheme, a Quadrature Phase Shift Keying (QPSK) modulation scheme, a 8QAM modulation scheme, a 16QAM modulation scheme, a 64QAM modulation scheme or any other suitable modulation scheme. In this specification, such known modulation schemes may also be referred to as "predefined" modulation schemes. In the following, the terms "modulation alphabet" and "modulation symbol" may be used wherein a modulation alphabet may be defined as a set of modulation symbols. A modulation symbol may be represented by a complex number in a constellation diagram wherein the complex number is assigned to a value of one or more bits. For example, a complete QPSK modulation alphabet may consist of modulation symbols representing the bit value combinations "00", "01", "10" and "11". Note however that the term "modulation alphabet" needs not be used for a complete set of modulation symbols of a modulation scheme. Referring back to QPSK, a modulation alphabet may also be restricted to the modulation symbols representing e.g. the bit combinations "00" and "01".

The methods and receivers described herein may be used for various wireless communications networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" may be used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). In particular, the methods and receiver circuits described herein may be used in the framework of mobile communication standards supporting multiple predefined modulation schemes or modulation alphabets. For example, the 3GPP Long Term Evolution (LTE) standard, which is based on the GSM/EDGE and UMTS/HSPA (High Speed Packet Access) technologies, supports QPSK, 16QAM and 64QAM. Similarly, each of WiMAX and Wireless LAN supports BPSK, QPSK, 16QAM and 64QAM.

In radio communications systems, a transmitter transmitting one or more radio communications signals over one or more radio communications channels is used. The transmitter may be a base station or a transmitting device included in a user's device, such as a mobile radio transceiver, a handheld radio device or any similar device. A base station (BS) may also be referred to as "NodeB" or "eNodeB". Radio communications signals transmitted by transmitters may be received by receivers such as a receiving device in a mobile radio transceiver or mobile station, a handheld radio device or any similar device. Receiver circuits as described herein may e.g. be included in such receivers. A mobile station is referred to as "User Equipment" (UE) herein.

The methods and receivers described herein may be operated according to a Multiple-Input Multiple-Output (MIMO) technique providing the use of multiple antennas at both the transmitter and receiver. The methods and receivers described herein may also be operated for the case of only one antenna at the receiver. MIMO is a part of various wireless communications standards such as e.g. IEEE 802.11n (Wi-Fi), 4G, 3GPP Long Term Evolution (LTE), WiMAX (specifically WiMAX 802.16e-2005) and HSPA+(specifically Release 7 and following Releases). The methods and receivers described herein may be operated in accordance of one or more of these standards.

The term "spatial multiplexing" used herein corresponds to a transmission technique in MIMO wireless communications being used to transmit independent and separately encoded data signals, so-called streams, from different transmit antennas of a base station. Similarly, a UE may receive multiple transmitted streams by means of one or a plurality of receive antennas. Such independent streams are also referred to as "layers" in the art. Spatial multiplexing allows to transmit the independent streams on the same resource e.g. in frequency and time domains. The encoding of data symbols in spatial multiplexing may be based on an open-loop approach or a closed-loop approach.

When the individual symbol streams (or layers) are assigned to a single user, this is called Single-User (SU) MIMO. Otherwise, when the individual symbol streams are assigned to various users, this is called Multi-User (MU) MIMO. The benefit of using MU-MIMO transmission is the naturally independent signals cross the receive antennas mounted over physically distributed UEs. Due to spatial multiplexing, MU-MIMO schemes allow multiple UEs to share the same resource in e.g. frequency and time domains. MU-MIMO may be regarded as an extended version of the Space-Division Multiple Access (SDMA) scheme. By way of example, in 3G/HSPA MU-MIMO, the UEs may share the same resource in time and channelization code (e.g. Orthogonal Variable Spreading Factor (OVSF)/Spreading Code).

For MU-MIMO, a base station may schedule a set of UEs for a data transmission with MU-MIMO. Transmission data is then transmitted from the base station to the scheduled UEs simultaneously and on the same resource element. During a data transmission interferences between independent symbol streams (layers) transmitted from the base station to the co-scheduled UEs may occur. This is called inter-layer interference. In MU-MIMO, for an appropriate detection of data symbols received at a target UE (i.e. the UE of the user of interest), it may be helpful to suppress inter-layer interference, i.e. interferences from co-scheduled UEs (also called interfering UEs). Note that the terms "target UE" and "co-scheduled UE/interfering UE" do not refer to an identical UE, but correspond to different mobile stations of different and typically remote users. For this purpose, it may be required to detect data symbols at the target UE which are actually being scheduled for an interfering UE, i.e. form part of a data stream (layer) assigned to the interfering, co-scheduled UE. The detection may be based on or may include a Near ML (Maximum Likelihood) algorithm such as e.g. SIC (Successive Interference Cancellation) and/or a ML algorithm.

FIG. 1 is a schematic illustration of a configuration of a MU-MIMO system with one base station BS. The MU-MIMO system could transmit L independent data streams (layers) to N users (mobile stations UEn, n=1, 2, ..., N) at e.g. the same time and frequency resource. L and N are integers with L≥N. Here, the MIMO channel matrix of the $n^{th}$ user is denoted by $H_n$. For the sake of ease of notation, the MIMO channel matrix of the user of interest (target UE) is simply written as H, i.e. without index. Bold face type characters correspond to vectors or matrixes, an underscore is indicative of a complex-valued character.

Since MU-MIMO aims to transmit symbol streams of multiple users at the same resources (e.g. time and frequency), without loss of generality, the representation used below is described by way of example at single-carrier, e.g. for each subcarrier of a multi-carrier system such as OFDM (Orthogonal Frequency Division Multiplexing).

Figure 2:
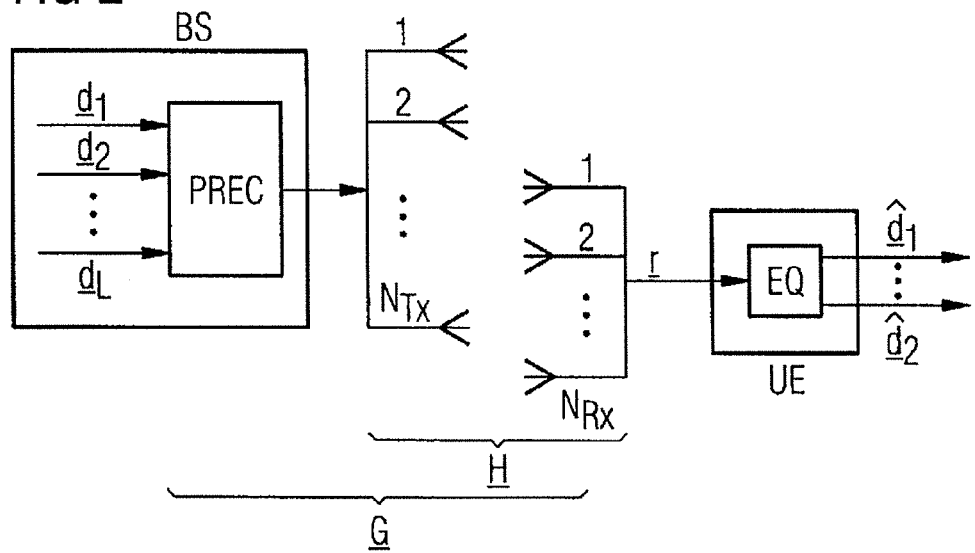
FIG. 2 schematically illustrates a block diagram of a MIMO system.

As shown in FIG. 2, base station BS may e.g. be equipped with $N_{Tx}$ transmit antennas and the target UE may be equipped with $N_{Rx}$ receive antennas. Thus, H may be represented by a $N_{Rx} \times N_{Tx}$ matrix. The other UEs assigned to other users (i.e. {UE1, UE2, ... UEN}\{UE}) may also be equipped with e.g. $N_{Rx}$ receive antennas. In this case, each MIMO channel matrix $H_n$ is of dimension $N_{Rx} \times N_{Tx}$.

According to FIG. 2, L independent symbol streams of symbols $d_l$, l=1, ..., L may be provided. As known in the art, previous processing to generate the data stream symbols $d_l$ may comprise e.g. channel coding, interleaving and modulation. Different modulation schemes may be used for modulation of the data stream symbols $d_l$ of different streams l.

The independent data streams of symbols $d_l$, l=1, ..., L may then be precoded in precoding unit PREC of BS. By precoding, each data stream is multiplied with complex weights to adjust the amplitude and phase of the signal to and from each antenna. Precoding may be used for multi-stream beamforming in the desired directions to increase the received signal gain at the respective UE to which a data stream is assigned. To this end, precoding may use knowledge of channel state information (CSI) at the transmitter (i.e. BS).

Further to FIG. 2, G is the channel matrix with respect to data streams for the target UE. As known in the art, G=H W, wherein W is the precoding matrix with L precoding vectors of dimension $N_{Tx} \times 1$, i.e. W=[$w_1$ $w_2$ ... $w_L$]. As G comprises channel fading and precoding, it is sometimes referred to as the "virtual" channel matrix in the art. Herein, since most of the following mathematical representation is related to symbol streams rather than to transmit antenna signals, G will simply be referred to as the "channel matrix" (bearing in mind that G is applied to a symbol stream vector d=[$d_1$ $d_2$ ... $d_L$]$^T$).

One or more of the transmitted symbol streams of concurrent symbols $d_l$, l=1, ..., L may be assigned to the target UE. If two or more symbol streams are assigned to the target UE, the MU-MIMO system is a multi-layer (ML) MU-MIMO system. ML MU-MIMO systems with two layers assigned to the target UE are referred to as dual-layer (DL) MU-MIMO systems in the art. Here, by way of example, symbol streams denoted by indices 1 and 2 are assigned to the target UE. The target UE comprises an equalizer EQ to generate detected symbols $\hat{d}_1$ and $\hat{d}_2$.

By way of example referring to the LTE standard, MU-MIMO was introduced in LTE Release 8 with Transmission Mode 5 (TM5). It was extended in LTE Release 9 and Release 10 with Transmission Mode 8 (TM8) and Transmission Mode 9 (TM9), respectively. TM5 allows MU-MIMO transmission with two co-scheduled UEs associated each with a single layer (i.e. symbol stream) and codebook based precoding. TM8 is the same, except non-codebook based precoding may be applied. In TM9, up to four UEs with four transmission layers are possibly co-scheduled. In addition, one UE in TM9 may be assigned with two transmission layers. That is, for the example of LTE, TM9 and transmission modes of higher Releases provide for ML MU-MIMO transmission.

In ML MU-MIMO scenarios, the target UE may receive "own" symbol streams in spatial multiplexing manner and faces intra-cell interference from the other co-scheduled UEs. Further, inter-cell interference from neighbor cells may possibly be present. The optimal scheduling in MU-MIMO transmission helps to reduce the intra-cell interference based on the geometrical alignment of precoders. However, due to the imperfect CSI feedback and time-variant channel the residual intra-cell interference may still be significant. Therefore, receiver designs for ML MU-MIMO transmission seek to improve signal detection under the constraint of inter-layer interference given by spatial multiplexing, intra-cell interference and the inter-cell interference.

Figure 3:
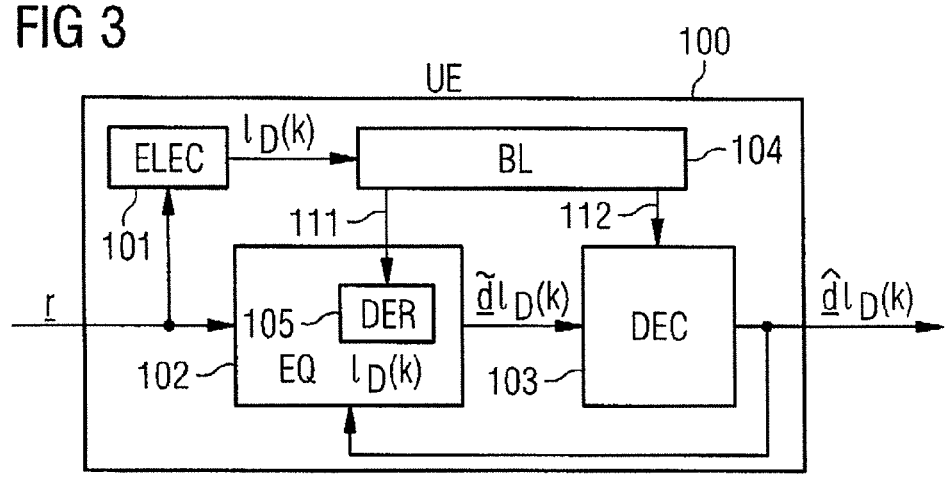
FIG. 3 schematically illustrates an exemplary receiver 100 with multi-layer successive interference cancellation.

FIG. 3 illustrates an exemplary receiver 100 of a target UE. The receiver 100 may comprise a symbol stream election unit (ELEC) 101, an equalizer (EQ) 102, a detector (DEC) 103, a blind modulation layer indicator (BL) 104 and a decision error computation unit (DER) 105.

The receiver 100 may operate as a successive interference cancellation (SIC) receiver. SIC receivers are joint receivers for multi-layer interference cancellation. The SIC process comprises successively detecting symbol streams and cancelling the actually detected symbol stream from the received signal before detecting the next symbol stream.

Typically, SIC receivers require information of the digital modulation schemes applied to the multiple symbol streams. However, this information is only available at the target UE for its own symbol streams, while for symbol streams assigned to other users, it is absent to the target UE. To solve this problem, the receiver 100 may apply blind modulation symbol detection and/or blind modulation quantization error estimation. These two concepts will be explained in the following in more detail.

As mentioned above, in SIC receivers the various symbol streams contained in the received signal r are detected one after the other, and detected symbols of a processed symbol stream are used for interference cancellation for detecting subsequent symbol streams. Here, k denotes the detection stage of SIC processing and $l_D(k)$ denotes the actual layer (symbol stream) to be detected at detection stage k.

At each detection stage k the blind modulation layer indicator 104 may receive the information $l_D(k)$ on the actual layer to be detected from the symbol stream election unit 101. Blind modulation layer indicator (BL) 104 decides whether $l_D(k)$ is an own layer to the target UE or an interference layer. The blind modulation layer indicator (BL) 104 may output a control signal 112 to be received by the detector (DEC) 103. The control signal 112 may inform the detector (DEC) 103 whether or not the actual symbol stream is an own symbol stream to the target UE or an interference symbol stream.

The detector (DEC) 103 receives an equalized symbol $\tilde{d}_{l_D(k)}$ output by the equalizer (EQ) 102. The detected symbol $\hat{d}_{l_D(k)}$ may be a hard decision of the equalized symbol $\tilde{d}_{l_D(k)}$. The detector (DEC) 103 may be configured to generate a detected symbol $\hat{d}_{l_D(k)}$ on the basis of a constellation which, if the actual symbol stream $l_D(k)$ is an interference symbol stream, is a mixed constellation comprising constellation points of at least two or all of multiple predefined modulation alphabets, and, if the actual symbol stream $l_D(k)$ is an own symbol stream, is the known constellation. Thus, the detected symbol $\hat{d}_{l_D(k)}$ is identical to one constellation point of the known constellation if $l_D(k)$ is an own symbol stream or to one constellation point of the mixed constellation if $l_D(k)$ is an interference symbol stream. Further, the output of the detector (DEC) 103 may be coupled to an input of the equalizer (EQ) 102 in order to inform the equalizer (EQ) 102 on the detected symbol at each detection stage k. In particular, the output of the detector (DEC) 103 may be coupled to an input of the decision error computation unit (DER) 105, as will be explained hereinafter.

Figure 4:
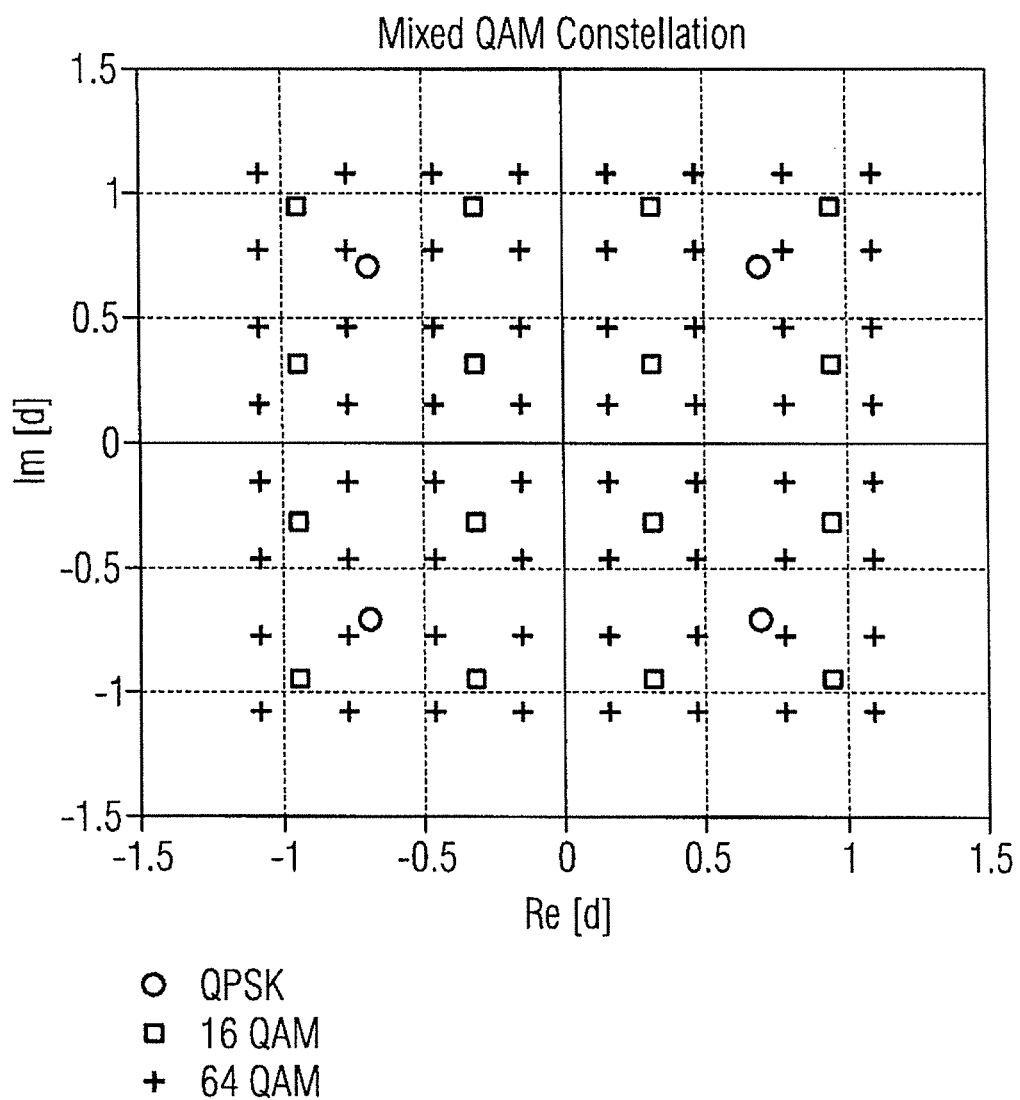
FIG. 4 schematically illustrates an exemplary mixed constellation with QPSK, 16QAM and 64QAM.

FIG. 4 is an example of a mixed constellation with QPSK, 16QAM and 64QAM constellation points. This mixed constellation may be used for deciding the detected symbol click $\hat{d}_{l_D(k)}$ based on the equalized symbol $\tilde{d}_{l_D(k)}$. More specifically, each equalized symbol $\tilde{d}_{l_D(k)}$ on an interference layer may be quantized to the nearest point in the mixed constellation for generating the hard decision symbol $\hat{d}_{l_D(k)}$ in the detector 103.

Receiver 100 of the target UE may be configured to process one or more of the interference layers (i.e. interference symbol streams) prior to detecting own layers. By way of example, the symbol stream election unit (ELEC) 101 may be configured to elect layers in an order depending on the signal-to-noise ratio (SNR) or signal strength of each symbol stream. The SNR or signal strength of a layer may be computed by the symbol stream election unit 101 based on the received signal r, and election of successive layers $l_D(k)$, k=1, 2, 3, ... may be performed in the order of decreasing SNR and/or decreasing signal strength. That way, if an interference layer is the layer having maximum SNR or signal strength, interference cancellation of an interference layer (i.e. symbol stream assigned to an interfering UE) may be accomplished first.

The option to firstly cancel signals from interference layers until the remaining strongest signal is from the own layers of the target UE may rely on the quantization error estimation extended to blind modulation schemes and/or the symbol detection extended to blind modulation schemes as may be used herein.

If $1_D(k)$ is an interference layer, the blind modulation layer indicator 104 may output a control signal 111 which may be identical to the control signal 112. The control signal 111 may inform the equalizer (EQ) 102 that $1_D(k)$ is an interference layer. This control signal 111 may be reported to the decision error computation unit (DER) 105. The decision error computation unit (DER) 105 may form part of the equalizer (EQ) 102. The decision error computation unit (DER) 105 may be configured to compute a quantization error of a detected symbol of symbol stream $1_D(k)$ relative to the transmitted symbol. In the case the decision error computation unit (DER) 105 is informed by control signal 111 that the actual symbol stream $1_D(k)$ is an interference symbol stream, the decision error computation unit (DER) 105 may be configured to compute the quantization error of the detected symbol based on a-priori symbol selection probabilities of multiple predefined modulation alphabets. As will be explained in the following in more detail, the multiple predefined modulation alphabets may comprise at least two or e.g. all of the modulation alphabets used in the ML MU-MIMO transmission system.

Figure 5:
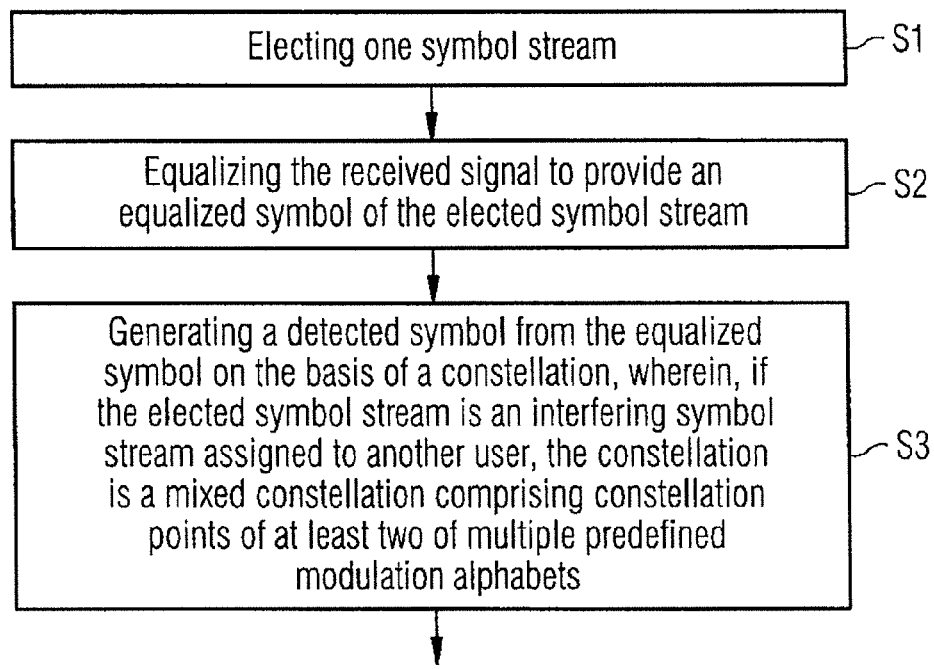
FIG. 5 schematically illustrates a flow diagram of an exemplary method of detecting a received signal comprising multiple symbol streams using blind modulation interference cancellation.

FIG. 5 exemplifies the concept of symbol detection extended to blind modulation schemes. In accordance with FIG. 5, an exemplary method of detecting a received signal comprising multiple symbol streams may include electing one symbol stream at S1. The election of the symbol stream may be performed by the symbol stream election unit (ELEC) 101, see FIG. 3.

The method may further comprise equalizing the received signal to provide an equalized symbol of the elected symbol stream at S2. Equalizing of the received signal may be performed by the equalizer (EQ) 102 of FIG. 3.

Further, at S3, the method may comprise generating a detected symbol from the equalized symbol on the basis of a constellation, wherein, if the elected symbol stream is an interference symbol stream assigned to another user, the constellation is a mixed constellation comprising constellation points of at least two of multiple predefined modulation alphabets. Generating the detected symbol may be performed by the detector (DEC) 103 of FIG. 3.

Figure 6:
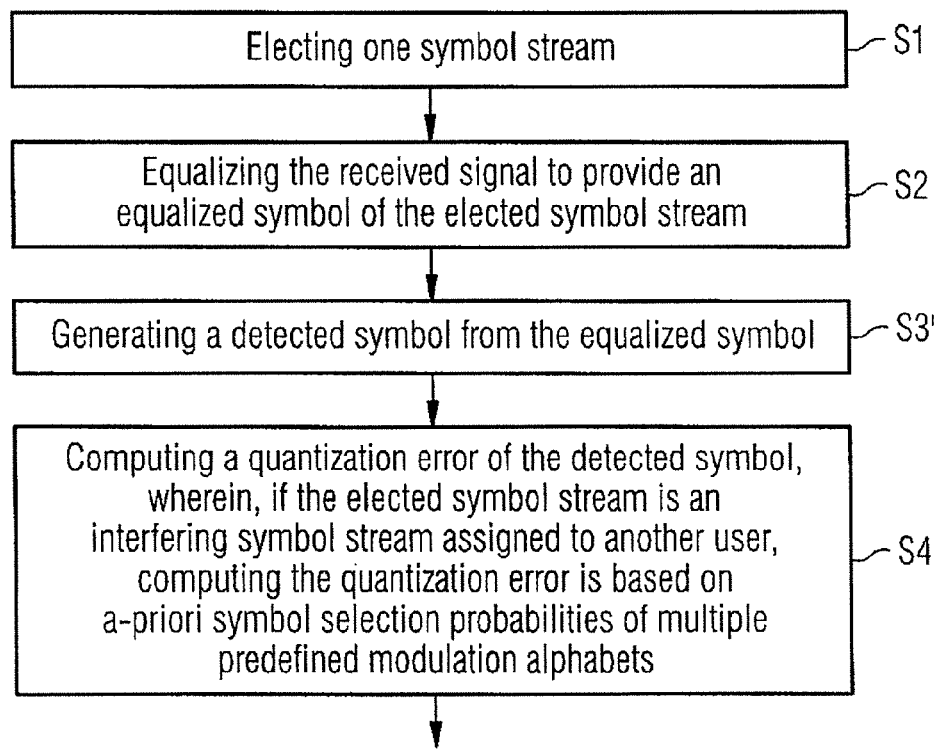
FIG. 6 schematically illustrates a flow diagram of an exemplary method of detecting a received signal comprising multiple symbol streams using blind modulation based quantization error estimation.

FIG. 6 exemplifies the concept of quantization error estimation extended to blind modulation schemes. FIG. 6 illustrates an exemplary method of detecting a received signal comprising multiple symbol streams, wherein this method may be performed in combination with or without the exemplary method described in conjunction with FIG. 5.

At S1 one symbol stream is elected, e.g. by the election unit (ELEC) 101 of FIG. 3.

At S2, the received signal is equalized to provide an equalized symbol of the elected symbol stream. Equalizing of the received signal may be performed by the equalizer (EQ) 102 of FIG. 3.

At S3' a detected symbol is generated from the equalized symbol. By way of example, if the elected symbol stream is an interference symbol stream assigned to another user, a mixed constellation comprising constellation points of at least two of multiple predefined modulation alphabets may be used as described above at S3.

At S4, a quantization error of the detected symbol is computed, wherein, if the elected symbol stream is an interference symbol stream assigned to another user, computing of the quantization error is based on a-priori symbol selection probabilities of multiple predefined modulation alphabets. The computation of the quantization error may be performed in the decision error computation unit 105 of FIG. 3. The quantization error derived at stage k may be used for equalization of the received signal at stage k+1 to generate an equalized symbol and to generate a detected symbol of a successive layer $1_D(k+1)$.

The detector 103 may comprise a soft output computation unit (not shown in FIG. 3) to also provide soft outputs of the detected symbols $\hat{d}_{l_D(k)}$. Soft outputs may, for example, be passed to a channel decoder (not shown in FIG. 3) which performs channel decoding. Channel decoding may comprise decoding of a concatenated code such as, e.g., a turbo code and/or a block code.

The blind quantization error estimation as described in conjunction with FIGS. 3 and 6 may provide soft outputs that are optimized for channel decoding. By way of example, the blind quantization error estimation in the decision error computation unit (DER) 105 at S4 may be carried out by using the (blind modulation) detected symbols of interference layers at S3 and a-priori probabilities of transmitting each modulation symbol of the mixed constellation. Then, quantization errors between the hard decision symbol and all other modulation symbols in blind modulation (i.e. the mixed constellation points) may be considered together with their Euclidean distances to generate the quantization error information, e.g. quantization error matrices such as the covariance matrix for each detection stage k. These quantization error matrices may be considered in the later interference cancellation processes for successive layers to produce improved soft outputs. A detailed mathematical framework on how to produce soft outputs of blind modulation symbols by using blind modulation decision error computation is presented further below.

Figure 7:
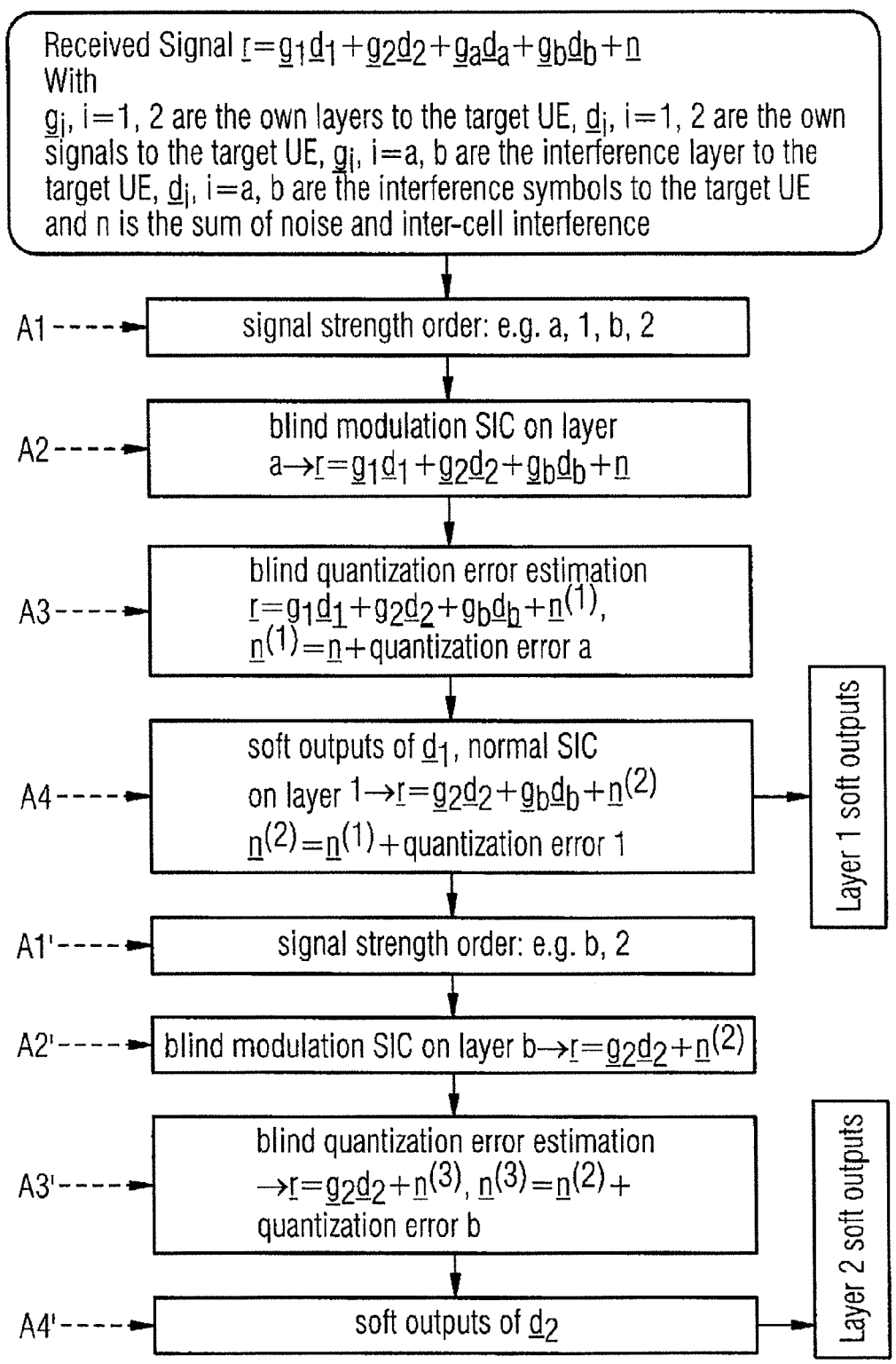
FIG. 7 schematically illustrates processes of an exemplary method of detecting a received signal comprising multiple symbol streams using a successive interference cancellation receiver.

In FIG. 7, an exemplary flow of data processing of a MU receiver such as e.g. receiver 100 is described. The MU receiver may be a soft-output (SO) blind SIC minimum mean square error (MMSE) receiver. Such receiver is also referred to as a SOSIC-MMSE receiver herein.

According to FIG. 7, the received signal r is given by $$r = g_1 d_1 + g_2 d_2 + g_a d_a + g_b d_b + n$$

with $g_i$, $d_i$, i=1, 2 are the channel vectors and symbols of own layers to the target UE, respectively, $g_i$, $d_i$, i=a, b are the channel vectors and symbols of interference layers to the target UE, respectively, and n is the sum of noise and inter-cell interference. All above vectors are of dimension $N_{Rx} \times 1$.

At A1, the SNR or signal strength order of the layers is determined. By way of example, this order may be i=a, 1, b, 2. In this case, interference layer a has the maximum strength order of signals over intra-cell layers.

The SOSIC-MMSE receiver 100 may then apply blind modulation SIC to cancel the symbol streams from interference UEs until the remaining strongest symbol streams are from the own layers of the target UE. In the above example blind modulation SIC is applied to layer a at A2. The received signal r is updated to $$r = g_1 d_1 + g_2 d_2 + g_b d_b + n$$

The SOSIC-MMSE receiver may then apply blind modulation based quantization error estimation of layer a. Hence, the sum of noise and inter-cell interference is updated at A3 to $$n^{(1)} = n + \text{quantization error of layer } a$$

The received signal r is updated to $$r = g_1 d_1 + g_2 d_2 + g_b g_b + n^{(1)}.$$

Then, soft outputs of symbol $d_1$ of layer 1 may be computed by applying normal SIC on layer 1. Soft outputs of symbol $d_1$ of own layer 1 are then output. The received signal r may then be updated by $$r = g_2 d_2 + g_b d_b + n^{(2)}$$

with $$n^{(2)} = n^{(1)} + \text{quantization error of layer 1}.$$

These steps may then be repeated as shown in FIG. 7 at A1', A2', A3' and A4' until all symbols from own layers are detected. Thus, soft outputs of symbol $d_2$ of own layer 2 are computed in the same way as soft outputs of symbol $d_1$ of layer 1. Soft outputs of symbol $d_2$ may then be output at A4'.

In the following, by way of example, a detailed mathematical framework on symbol detection and quantization error estimation in blind modulation is presented. The following detailed mathematical framework is provided for purpose of explanation and is not intended to limit any examples or implementations described herein to the formalism presented below.

Below, by way of example, a SOSIC MMSE receiver adapted to TM9 is considered. In what follows, without loss of generality, a MIMO system with unique layer numbers from 1-4 is considered. The system function is given by $$r = Gd + n = \sum_{l=1}^{4} g_l d_l + n. \tag{1}$$

At the kth detection stage, $k \in \{1, \ldots, 4\}$, the symbol on $l_D(k)$th layer is desired to be detected. All symbols in $\{l_D(1), \ldots, l_D(k-1)\}$ layers have been detected with decisions of $$\{\hat{d}_{l_D(1)}, \ldots, \hat{d}_{l_D(k-1)}\}. \tag{2}$$

According to the SIC concept, the updated receiver vector at the kth detection stage is $$\underline{r}(k) = \underline{r} - \sum_{l \in \{l_D(1), \ldots, l_D(k-1)\}} \underline{g}_l \hat{d}_l \tag{3}$$

$$= \underline{g}_{l_D(k)} d_{l_D(k)} + \underbrace{\sum_{l \in \{l_D(1), \ldots, l_D(k-1)\}} \underline{g}_l (d_l - \hat{d}_l)}_{z_D} +$$

$$\underbrace{\sum_{l \in \{1, \ldots, 4\} \setminus \{l_D(1), \ldots, l_D(k-1)\}} \underline{g}_l d_l + \underline{n}}_{z_U}$$

$$= \underline{g}_{l_D(k)} d_{l_D(k)} + z_D + z_U + \underline{n},$$

with $z_D$ being the residual interference caused by decision error propagation and $z_U$ being the interference from undetected symbols.

With consideration of decision error propagation, $\{\hat{d}_{l_D(1)}, \ldots, \hat{d}_{l_D(k-1)}\}$ might be unequal to $\{d_{l_D(1)}, \ldots, d_{l_D(k-1)}\}$, and therefore $z_D \neq 0$. By assuming uncorrelated data symbols over all layers and defining $e_{l_D(m)} = \hat{d}_{l_D(m)} - d_{l_D(m)}$, $m = 1, \ldots, k-1$, the MMSE equalizer for the kth detection stage is represented as $$M_{MMSE}(k) = E_{d, layer} \underline{g}_{l_D(k)}^H \left( E_{d, layer} \underline{g}_{l_D(k)} \underline{g}_{l_D(k)}^H + R_{z_U z_U} + R_{z_D z_D} + R_{nn} \right)^{-1} \tag{4}$$

$$= E_{d, layer} \underline{g}_{l_D(k)}^H \left( \begin{array}{c} E_{d, layer} \underline{g}_{l_D(k)} \underline{g}_{l_D(k)}^H + E_{d, layer} \sum_{l \in \{1, \ldots, 4\} \setminus \{l_D(1), \ldots, l_D(k)\}} \underline{g}_l \underline{g}_l^H + \\ \sum_{l \in \{l_D(1), \ldots, l_D(k-1)\}} \sum_{m \in \{l_D(1), \ldots, l_D(k-1)\}} \underline{g}_l E\{e_{l_D(l)} e_{l_D(m)}^*\} \underline{g}_m^H + N_0 I \end{array} \right)^{-1}$$

$$= E_{d, layer} \underline{g}_{l_D(k)}^H \left( E_{d, layer} \underline{g}_{l_D(k)} \underline{g}_{l_D(k)}^H + E_{d, layer} \underline{G}_U(k) \underline{G}_U^H(k) + \underline{G}_D(k) R_{e_D e_D}(k) \underline{G}_D^H(k) + N_0 I \right)^{-1},$$

with $$\underline{G}_D(k) = [\underline{g}_{l_D(1)} \cdots \underline{g}_{l_D(k-1)}], \tag{5}$$

$$\underline{G}_U(k) = \{\underline{g}_l\}, l \in \{1, \ldots, 4\} \setminus \{l_D(1), \ldots, l_D(k)\}, \tag{6}$$

Computing the MMSE equalizer for the kth detection stage requires to obtain the $k-1 \times k-1$ decision error covariance matrix defined by $$R_{e_D e_D}(k) = \begin{bmatrix} E\{e_{l_D(1)} e_{l_D(1)}^*\} & \cdots & E\{e_{l_D(1)} e_{l_D(k-1)}^*\} \\ \vdots & \ddots & \vdots \\ E\{e_{l_D(k-1)} e_{l_D(1)}^*\} & \cdots & E\{e_{l_D(k-1)} e_{l_D(k-1)}^*\} \end{bmatrix} \tag{7}$$

Each element of $$R_{e_D e_D}$$

can be given as $$E\{e_{l_D(l)} e_{l_D(m)}^*\} = \tag{8}$$

$$\begin{cases} E\{(|\hat{d}_{l_D(l)} - d_{l_D(l)}|^2 | \hat{d}_{l_D(l)})\}, & l = m \\ E\{(\hat{d}_{l_D(l)} - d_{l_D(l)} | \hat{d}_{l_D(l)})\} E\{(\hat{d}_{l_D(m)}^* - d_{l_D(m)}^* | \hat{d}_{l_D(m)})\}, & l \neq m \end{cases}$$

$E\{\}$ is the expectation operator. Without loss of generality it is assumed that columns in $G_D(k)$ and $G_U(k)$ are sorted with ascending indices as given in the (virtual) channel matrix G.

At each stage k, the computation of the decision error covariance matrix may depend on whether or not the layer $l_D(k)$ is a layer assigned to the target UE (i.e. an "own" layer) or a layer assigned to another UE of the MU-MIMO system (i.e. an interference layer). The different computation schemes will be described further below.

Computation of the Equalized Symbol of Layer $l_D(k)$

The equalized symbol of layer $l_d(k)$ may be computed by $$\tilde{d}_{l_D(k)} = u_{l_D(k)}^T M_{MMSE}(k) r(k), \quad (9)$$

with $$u_{l_D(k)}^T = \begin{bmatrix} 0 & \cdots & 0 & \underbrace{1}_{l_D(k)\text{th position}} & 0 & \cdots & 0 \end{bmatrix}.$$

Computation of the Channel Gain of the Layer $l_D(k)$

The channel gain of layer $l_D(k)$ may be computed by $$\mu_{l_D(k)} = u_{l_D(k)}^T M_{MMSE}(k) g_{l_D(k)}. \quad (10)$$

Computation of the Soft Outputs of the Symbols of Layer $l_D(k)$.

At the kth detection stage, soft-outputs of the symbol $d_{l_D(k)}$ is calculated based on the symbol wise Max-Log-MAP criterion. The soft output (LLR value) of the mth bit in $d_{l_D(k)}$ may be given by $$\Lambda(c_m) \approx \frac{\gamma_{MMSE}(k)}{E_{d,layer}} \left( \left| \frac{\tilde{d}_{l_D(k)}}{\mu_{l_D(k)}} - \hat{d}_{l_D(k)}^{(1)} \right|^2 - \left| \frac{\tilde{d}_{l_D(k)}}{\mu_{l_D(k)}} - \hat{d}_{l_D(k)}^{(0)} \right|^2 \right). \quad (11)$$

with $d_{l_D(k)}^{(1)}$ being the hard decision of $\tilde{d}_{l_D(k)}/\mu_{l_D(k)}$ with the bit value of 1 in the $c_m$, $\hat{d}_{l_D(k)}^{(0)}$ being the hard decision of $\tilde{d}_{l_D(k)}/\mu_{l_D(k)}$ with the bit value of 0 in the $c_m$ and $\gamma_{MMSE}(k)$ being the post-SNR value for the corresponding layer in the kth detection stage.

Computation of the Next Layer $l_D(k+1)$

After getting $\hat{d}_{l_D(k)}$, it comes to the (k+1)th detection stage. $G_D(k+1)$ is updated to have columns of $g_l$, $l \in \{l_D(1), \ldots, l_D(k)\}$ and $$R_{e_D e_D}$$

is increased to be a k×k matrix of $$\underline{R}_{e_D e_D}(k+1) = \begin{bmatrix} R_{e_D e_D}(k) & & E\{e_{l_D(1)} e_{l_D(k)}^*\} \\ & \vdots & \\ E\{e_{l_D(1)} e_{l_D(1)}^*\} & \cdots & E\{e_{l_D(k)} e_{l_D(k)}^*\} \end{bmatrix} \quad (11)$$

with $$e_D(k+1) = [\hat{d}_{l_D(1)}, \ldots, \hat{d}_{l_D(k)}] - [d_{l_D(1)}, \ldots, d_{l_D(k)}]. \quad (12)$$

Consequently, the MMSE filter for the (k+1)th detection stage is given as $$M_{MMSE}(k+1) = E_{d,layer} \underline{G}_U^H(k) \quad (13)$$
$$\left( E_{d,layer} \underline{G}_U(k) \underline{G}_U^H(k) + \underline{G}_D(k+1) \underline{R}_{e_D e_D}(k+1) \underline{G}_D^H(k+1) + N_0 I \right)^{-1}.$$

with the mean square error (MSE) of each undetected layer being $$MSE_{MMSE,n}(k+1) = \quad (14)$$
$$\left[ \left( \underline{G}_U^H(k) \left( \underline{G}_D(k+1) R_{e_D e_D}(k+1) \underline{G}_D^H(k+1) + N_0 I \right)^{-1} \underline{G}_U(k) + \frac{1}{E_{d,layer}} I \right)^{-1} \right]_{n,n},$$

and n=1, ..., 4−k represents the column index of columns in $G_U(k)$. The post-SNR of each undetected layer is $$\gamma_{MMSE,n}(k+1) = \frac{E_{d,layer}}{MSE_{MMSE,n}(k+1)} - 1. \quad (15)$$

Following the optimal decision order, the detection layer at the (k+1)th detection stage may be the one with the largest post-SNR in equation (15) or equivalently the minimum MSE, i.e.

$$l_D(k+1) = \quad (16)$$
$$f_{Tr}\left( \underset{n=1,\ldots,4-k}{\operatorname{argmax}} \{\gamma_{MMSE,n}(k+1)\} \right) = f_{Tr}\left( \underset{n=1,\ldots,4-k}{\operatorname{argmin}} \{MSE_{MMSE,n}(k+1)\} \right).$$

in which $f_{Tr}(\bullet)$ is the transfer function to map the selected n to the global column index 1, ..., 4 in G.

Updating the MMSE Channel Matrix at Stage k+1

Updating the MMSE channel matrix according to $l_D(k+1)$ yields $$\underline{M}_{MMSE}(k) = E_{d,layer} \quad (17)$$
$$\underline{g}_{l_D(k+1)}^H \begin{pmatrix} E_{d,layer} g_{l_D(k+1)} g_{l_D(k+1)}^H + E_{d,layer} \underline{G}_U(k+1) \underline{G}_U^H(k+1) + \\ \underline{G}_D(k+1) R_{e_D e_D}(k+1) \underline{G}_D^H(k+1) + N_0 I \end{pmatrix}^{-1}.$$

with $\underline{G}_U(k+1) = \{g_l\}, l \in \{1, \ldots, 4\} \setminus \{l_D(1), \ldots, l_D(k+1)\}$.

Updating the Received Signal Vector at Stage k+1

The received signal vector may be updated as $r(k+1) = r - \Sigma_{l \in \{l_D(1), \ldots, l_D(k)\}} g_l \hat{d}_l$. Decision on the $l_D(k+1)$ transmission layer can then be carried out at the (k+1)th detection stage. This process of received signal vector updating, election of the successive layer and detection may be continued until all required symbols are detected.

Computation of the Decision Error Covariance Matrix

As mentioned above, the computation of the decision error covariance matrix depends on whether the layer $l_D(k)$ under consideration in stage k is assigned to the target UE or to an interfering UE. First, it is considered the case that $l_D(k)$ is assigned to the target UE. In this case, the modulation alphabet used at the transmitter is known.

Computation of the Decision Error Covariance Matrix with Known Modulation

Computation of the decision error covariance matrix with known modulation in SIC may start with representation of $E\{e_{l_D(l)}\}$ as $$E\{e_{l_D(l)}\} = E\{(\hat{d}_{l_D(l)} - d_{l_D(l)} | \hat{d}_{l_D(l)})\} \quad (18)$$
$$= \sum_{d_{l_D(l)} \in \chi} (\hat{d}_{l_D(l)} - d_{l_D(l)}) P(d_{l_D(l)} | \hat{d}_{l_D(l)}).$$

Here $P(d_{l_D(l)} | \hat{d}_{l_D(l)})$ is the posterior probability of having $d_{l_D(l)}$ being sent with the condition on the observation of $\hat{d}_{l_D(l)}$. It applies Bayes' theorem on $P(d_{l_D(l)} | \hat{d}_{l_D(l)})$ and gets $$P(d_{l_D(l)} | \hat{d}_{l_D(l)}) = P(d_{l_D(l)} | \tilde{d}_{l_D(l)}) \quad (19)$$
$$= \frac{P(\tilde{d}_{l_D(l)} | d_{l_D(l)}) P(d_{l_D(l)})}{P(\tilde{d}_{l_D(l)})}$$
$$\propto P(\tilde{d}_{l_D(l)} | d_{l_D(l)}),$$

in which $\tilde{d}_{l_D(l)}$ is the equalized symbol given in (9) and $P(d_{l_D(l)})$ is same for all constellation points. With the assumed Gaussian approximation, the likelihood function $P(\tilde{d}_{l_D(l)} | d_{l_D(l)})$ is given as $$P(\tilde{d}_{l_D(l)} | d_{l_D(l)}) = \frac{1}{\sqrt{\pi E_{d,layer}/\gamma}} \exp\left(-\frac{|\tilde{d}_{l_D(k)}/\mu_{l_D(k)} - d_{l_D(l)}|^2}{E_{d,layer}/\gamma}\right) \quad (20)$$
$$\propto \exp\left(-\frac{|\tilde{d}_{l_D(k)}/\mu_{l_D(k)} - d_{l_D(l)}|^2}{E_{d,layer}/\gamma}\right).$$

with $\mu_{l_D(k)}$ being the channel gain after equalizer as defined above.

Using equation (20) in equation (19) yields $$P(d_{l_D(l)} | \hat{d}_{l_D(l)}) = \alpha \exp\left(-\frac{|\tilde{d}_{l_D(k)}/\mu_{l_D(k)} - d_{l_D(l)}|^2}{E_{d,layer}/\gamma}\right). \quad (21)$$

Here $\alpha$ is the scaling factor and satisfies $$\sum_{d_{l_D(l)} \in \chi} P(d_{l_D(l)} | \hat{d}_{l_D(l)}) = 1 \Rightarrow \quad (22)$$
$$\alpha = 1 \Big/ \left(\sum_{d_{l_D(l)} \in \chi} \exp\left(-\frac{|\tilde{d}_{l_D(k)}/\mu_{l_D(k)} - d_{l_D(l)}|^2}{E_{d,layer}/\gamma}\right)\right).$$

With equation (21), the mean value of decision error is $$E\{e_{l_D(l)}\} = E\{(\hat{d}_{l_D(l)} - d_{l_D(l)} | \hat{d}_{l_D(l)})\} \quad (23)$$
$$= \alpha \sum_{d_{l_D(l)} \in \chi} (\hat{d}_{l_D(l)} - d_{l_D(l)}) \exp\left(-\frac{|\tilde{d}_{l_D(k)}/\mu_{l_D(k)} - d_{l_D(l)}|^2}{E_{d,layer}/\gamma}\right).$$

Then, the complete $$R_{e_D e_D}(k)$$

can be established.

There may be also other methods to compute the decision error covariance matrix with known modulation. The disclosure herein is not restricted to the above method.

Computation of the Decision Error Covariance Matrix with Unknown Modulation

In order to calculate the decision error covariance matrix with the symbols with blind modulations, equation (19) is extended for the mixed constellation in FIG. 4. Since different numbers of constellation points are provided in different modulations, modulation symbols in FIG. 4 have different a-priori probabilities to be transmitted. A-priori symbol selection probabilities of these modulations may be given as $$P_{QPSK}(d_{l_D(l)}) = 1/4 = 1/2^{b_{QPSK}}$$
$$P_{16QAM}(d_{l_D(l)}) = 1/16 = 1/2^{b_{16QAM}}$$
$$P_{64QAM}(d_{l_D(l)}) = 1/64 = 1/2^{b_{64QAM}}$$

where $b_{QPSK}=2$, $b_{16QAM}=4$ and $b_{64QAM}=6$ are the number of bits (or orders of modulation) in QPSK, 16QAM and 64QAM, respectively. Without loss of generality it is assumed that these three modulations will e.g. be chosen for the interference layer equally, which means $P(b_{QPSK})=P(b_{16QAM})=P(b_{64QAM})=1/3$. Hence, $$P(d_{l_D(l)}) = 1/(3 \times 2^{2k}), d_{l_D(l)} \in \chi(2k), k=1,2,3. \quad (24)$$

With this a-priori knowledge, equation (19) may be extended to be $$P(d_{l_D(l)} | \hat{d}_{l_D(l)}) \propto P(\tilde{d}_{l_D(l)} | d_{l_D(l)})/(3 \times 2^{2k}), d_{l_D(l)} \in \chi(2k), k=1,2,3. \quad (25)$$

Applying (25) into (21) yields $$\sum_{k=1}^{3} \sum_{d_{l_D(l)} \in \chi(2k)} P(\tilde{d}_{l_D(l)} | d_{l_D(l)})/(3 \times 2^{2k}) = 1 \Rightarrow \quad (26)$$
$$\alpha = 1 \Big/ \left(\sum_{k=1}^{3} \sum_{d_{l_D(l)} \in \chi(2k)} \exp\left(-\frac{|\tilde{d}_{l_D(k)}/\mu_{l_D(k)} - d_{l_D(l)}|^2}{E_{d,layer}/\gamma}\right)\Big/(3 \times 2^{2k})\right).$$

Finally, the mean value of decision error with blind modulations is $$E\{e_{l_D(l)}\} = E\{(\hat{d}_{l_D(l)} - d_{l_D(l)} | \hat{d}_{l_D(l)})\} \quad (27)$$
$$= \alpha \sum_{d_{l_D(l)} \in \chi} (\hat{d}_{l_D(l)} - d_{l_D(l)}) \exp\left(-\frac{|\tilde{d}_{l_D(k)}/\mu_{l_D(k)} - d_{l_D(l)}|^2}{E_{d,layer}/\gamma}\right) \Big/$$
$$(3 \times 2^{2k}).$$

Furthermore the complete covariance matrix $$R_{e_D e_D}(k)$$

can be established.

In summary, the $$R_{e_D e_D}(k)$$

computation method may be given as Compute the equalized symbol $\tilde{d}_{l_D(l)}$, hard decision $\hat{d}_{l_D(l)}$, e.g. channel gain $\mu_{l_D(k)}$, and e.g. post-SNR $\gamma$ of the corresponding layers; results depend on whether or not $l_D(l)$ is an own layer or an interference layer. Compute the equalized Euclidean distances of the $\tilde{d}_{l_D(l)}$ and all possible constellation points and furthermore $P(d_{l_D(l)}|\hat{d}_{l_D(l)})$ with the correct a; results depend on whether or not $l_D(l)$ is an own layer or an interference layer.
Compute the elements in $$R_{e_D e_D}(k)$$

according to equation (18) and $P(d_{l_D(l)}|\hat{d}_{l_D(l)})$; results depend on whether or not $l_D(l)$ is an own layer or an interference layer.
Symbol Detection with Blind Modulation Since e.g. three modulations, namely e.g. QPSK, 16QAM and 64QAM, are supported for payload data transmission in data subcarriers, the symbol detection with blind modulations shall include all these three modulations. In FIG. 4 a mixed constellation of QPSK, 16QAM and 64QAM is depicted. The average symbol energy per each modulation is normalized to be $E_{d,layer}=1$. FIG. 4 may illustrate the base constellation for the symbol detection with blind modulations. Each equalized symbol on the interference layer will be quantized to the nearest point in this mixed constellation in the step of hard decision. Therefore the SOSIC can be applied with cancellation of the interference layer before own layers being detected.

The SER (Symbol Error Rate) of the mixed constellation may not be the same for all points due to non-equal distance between different points. This means that the residual decision errors (and thus the error propagation) depend not only on the post-SNR, but also on the used modulation on the interference layer. If symbols near the QPSK points are transmitted on the interference layer, the decision error is higher than the case with other transmitted symbols.

The computation effort of hard decision with blind modulations as explained above may be slightly higher than the hard decision of 64QAM due to the non-equal distance between symbols. The computation efforts of decision error covariance matrix is 30% to 40% more than the case for 64QAM. The residual decision error can only disappear with very large post-SNR, which may not be satisfied in the context of ML-MU MIMO for the interference layer. However, symbol detection with blind modulations allows the use of SOSIC in the case of interference is stronger than the own layer signals.

Figure 8:
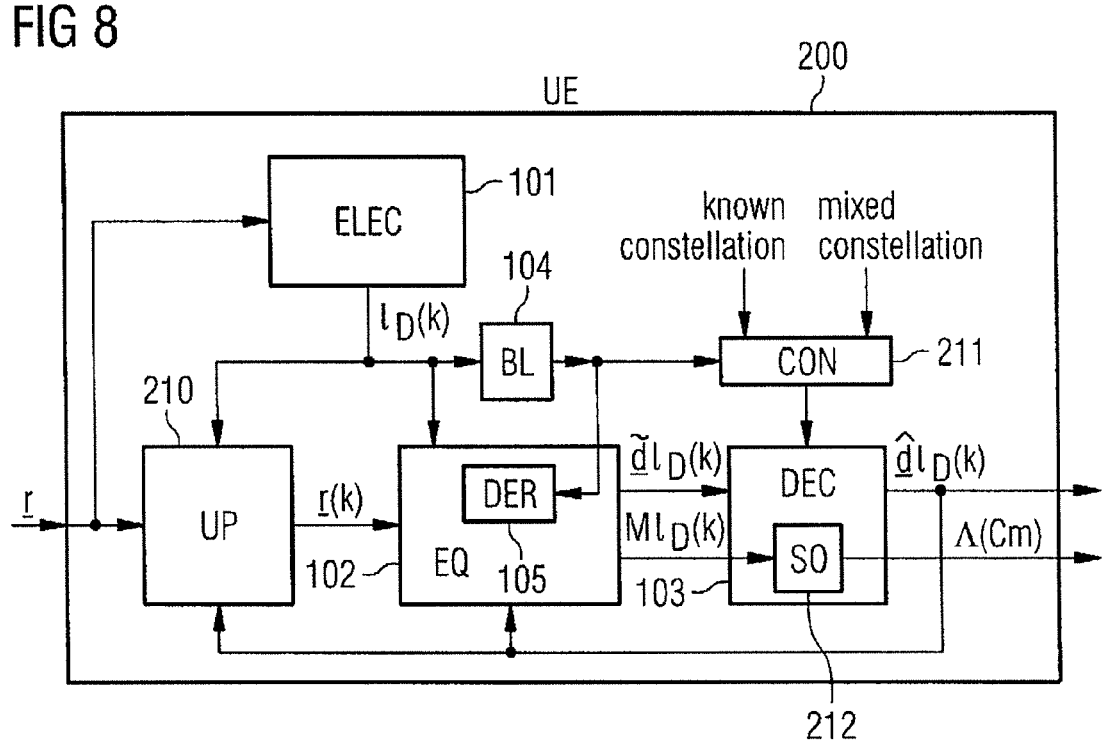
FIG. 8 schematically illustrates an exemplary receiver 200 with multi-layer successive interference cancellation.

FIG. 8 illustrates an exemplary receiver 200 of a target UE. The receiver 200 may be designed in accordance with receiver 100 shown in FIG. 3. The implementation illustrated in FIG. 8 of receiver 200 is more detailed than the implementation of receiver 100, wherein additional features of receiver 200 may be understood as optional features.

The receiver 200 may further comprise a receive signal update unit (UP) 210, a constellation generator (CON) 211 and a soft output unit (SO) 212. Receive signal update unit (UP) 210 is configured to update the receive signal vector r(k) at the $k^{th}$ detection stage. Thus, at each detection stage k, interference is cancelled from the input symbol stream based on the hard outputs of the detector (DEC) 103 for the previous detection stage k−1. Further, the receive signal update unit (UP) 210 may be coupled to the symbol stream election unit (ELEC) 101 in order to obtain the information about the new symbol stream or layer $l_D(k)$ to be detected at the $k^{th}$ detection stage.

The constellation generator (CON) 211 may have a control input coupled to an output of the blind modulation layer indicator (BL) 104. Thus, the constellation generator (CON) 211 is informed on whether at the actual $k^{th}$ detection stage, a layer assigned to the target UE (own layer) or a layer assigned to another UE (interference layer) is to be processed. Depending on this information, either the known constellation, when processing an own layer, or the mixed constellation, when processing an interference layer, may be output by the constellation generator (CON) 211 and provided to the detector (DEC) 103.

Soft output unit (SO) 212 may be configured to compute soft outputs as e.g. described above. To this end, the soft output unit (SO) 212 may receive information on the channel gain, on the equalized symbol $\tilde{d}_{l_D(k)}$ and on the hard decided symbol $\hat{d}_{l_D(k)}$.

Figure 9:
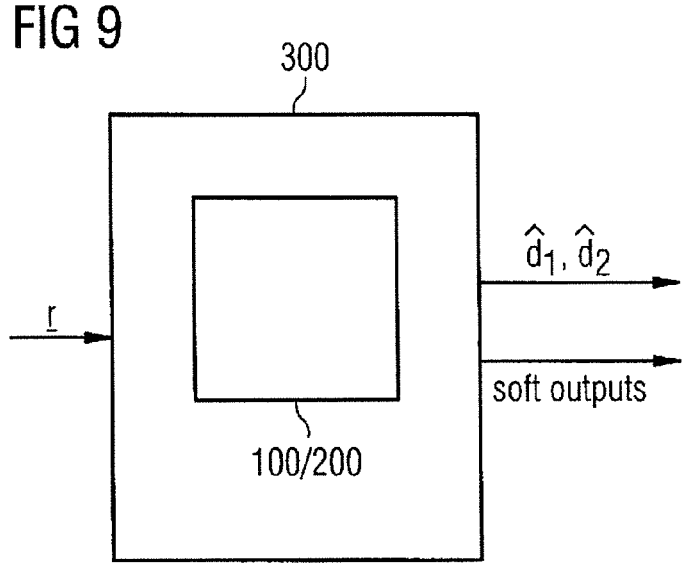
FIG. 9 schematically illustrates an exemplary receiver 300 with multi-layer interference cancellation and maximum likelihood symbol detection.

FIG. 9 is a block diagram of an exemplary receiver 300. Receiver 300 may comprise receiver 100 or 200 operating on the blind modulation detection and/or blind modulation decision error quantization scheme as an inner receiver. The inner receiver 100, 200 is configured to detect one or more interference layers. Detection of the own layers, however, is performed by the "outer" receiver 300. The outer receiver 300 may be a MLD (Maximum Likelihood Detector). Thus, the own layers are detected by an optimum ML scheme, while at least one interference layer, e.g. the one with maximum strength or SNR, is detected by the inner receiver 100, 200 (which is not an MLD but may be a SIC receiver). Similar to receiver 100 and 200, the receiver 300 may generate and output hard decision outputs and soft decision outputs.

Figure 10:
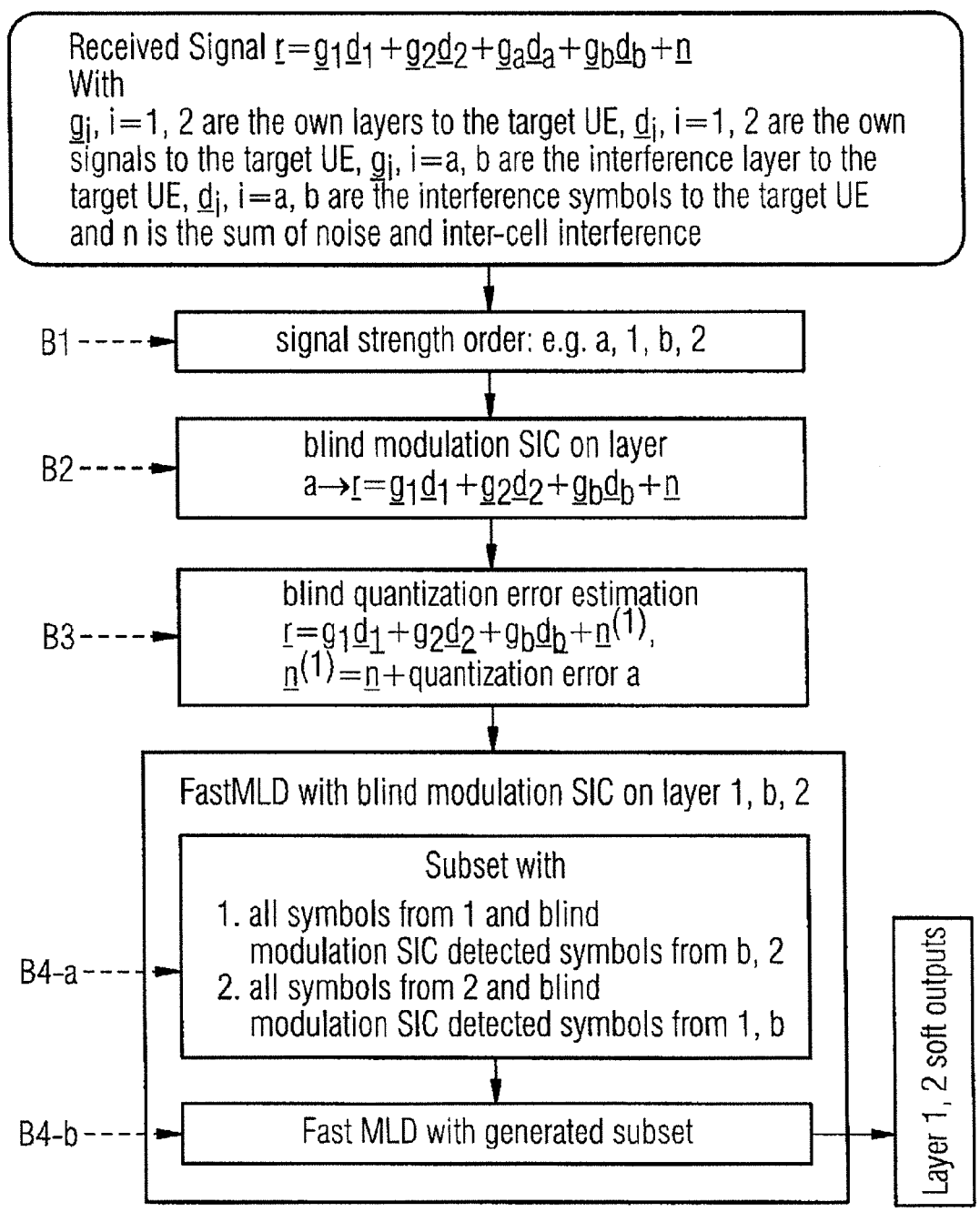
FIG. 10 schematically illustrates processes of an exemplary method of detecting a received signal comprising multiple symbol streams using a successive interference cancellation receiver and a maximum likelihood receiver.

The operation of the receiver 300 is exemplified in FIG. 10. Again, it is considered by way of example a received signal given by $$r = g_1 d_1 + g_2 d_2 + g_a d_a + n$$

with $g_i$, $d_i$, i=1, 2 are the channel vectors and symbols of own layers to the target UE, respectively, $g_i$, $d_i$, i=a, b are the channel vectors and symbols of interference layers to the target UE, respectively, and n is the sum of noise and inter-cell interference.

At B1, the SNR or signal strength order of the layers is determined. Process B1 may be identical with process A1 of FIG. 7.

The inner SIC receiver 100, 200, e.g. a SOSIC-MMSE receiver as described above, may then apply blind modulation SIC to cancel the layers (symbol streams) from interference UEs until the remaining strongest signals are from the own layers of the target UE. In the above example blind modulation SIC is applied to layer a at B2. The received signal r is updated to $$r = g_1 d_1 + g_2 d_2 + g_b d_b + n$$

in accordance with process A2 of FIG. 7.

The inner receiver 100, 200 may then apply blind modulation based quantization error estimation of layer a at process B3. Process B3 corresponds to process A3 of FIG. 7. New noise term after process B2 on the received signal r may be expressed by $$n^{(1)} = n + \text{quantization error of layer } a.$$

Then, if the strongest (or highest SNR) interference layer(s) is (are) identified and interference cancellation by blind modulation SIC and/or blind quantization error estimation is done, the outer MLD receiver 300 may be used for detecting the own layers 1, 2.

By way of example, the MLD receiver 300 may operate on a specific ML scheme which is referred to as FastMLD in the following. Thus, starting with the updated receive signal r on which interference of the strongest interference layer a has been cancelled, the FastMLD with blind modulation SIC is performed on residual layers 1, b, 2.

A FastMLD scheme is presented in the document "Efficient maximum likelihood detector for MIMO systems with small number of streams", in Proc. of IEE Electronic Letters, Vol. 43, No. 22, October 2007 by Y. Lomnitz and D. Andelman, which is incorporated herein by reference. In FastMLD as described therein, the total number of hypotheses of the symbols transmitted in parallel via $N_{Tx}$ transmission antennas is decreased by merely scanning $N_{Tx}-1$ transmission antennas. For each hypothesis on the $N_{Tx}-1$ transmission antennas an optimum choice for the remaining transmission antenna may then be calculated in a further step.

Here, the FastMLD scheme is adapted to multiple symbol streams. To this end, at process B4-a, a first subset with all symbols from layer 1 and blind modulation SIC detected symbols from layers b and 2 may be formed. In addition, a second subset with all symbols from layer 2 and blind modulation SIC detected symbols from layers 1 and b may be formed.

Then, in a further process, the FastMLD detection scheme is applied on the generated subsets. That way, hard outputs and/or soft outputs of symbols of layer 1 and layer 2 assigned to the target UE, i.e. the own layers, are generated.

In the following, the FastMLD scheme operating on subsets as defined above is described in more detail.

The precoded data x transmitted by the base station at an arbitrary time instant may be expressed as $$x = \frac{1}{\sqrt{L}} \sum_{l=1}^{L} w_l d_l \quad (28)$$

wherein $w_1$ denotes a precoding vector of dimension $N_{Tx} \times 1$ for the l-th layer which may be chosen from e.g. a precoding codebook having an arbitrary number of entries. The precoded data x thus corresponds to a vector of dimension $N_{Tx} \times 1$ containing the signals sent by the $N_{Tx}$ transmission antennas of the base station. The vector x may be normalized, i.e.

$$E\{[x^*x]\} = 1 \quad (29)$$

The signal vector r received by the target UE may thus be expressed as a vector $$r = Hx + n \quad (30)$$

of dimension $N_{Rx} \times 1$ wherein H denotes the channel matrix which is assumed to be known or estimated at the target UE.

Combining equations (28) and (30), the received signal r may be expressed as $$\underline{r} = \frac{1}{\sqrt{L}} H \sum_{l=1}^{L} w_l d_l + \underline{n} = \underline{G}\underline{d} + \underline{n} \quad (31)$$

or $$\underline{r} = \frac{1}{\sqrt{L}} H w_1 d_1 + \frac{1}{\sqrt{L}} H \sum_{l=2}^{L} w_l d_l + \underline{n} = g_1 d_1 + \tilde{\underline{G}} \tilde{\underline{d}} + \underline{n}. \quad (32)$$

At the target UE, it may be desired to decode the transmitted signal vector d from the received signal vector r. An ML solution may correspond to finding the most likely solution $$\hat{\underline{d}} = \underset{\underline{d} \in C_1 \times \ldots \times C_L}{\operatorname{argmax}} \; Pr(\underline{r}|\underline{d}) \quad (33)$$

for the transmitted symbol d. Here, $C_l$ denotes a modulation alphabet including a number of $M_l$ modulation symbols that has been used for modulating the transmitted symbol of layer l while the function "Pr" denotes a probability of a respective solution d. The ML solution of equation (33) corresponds to minimizing the Euclidean distance between the transmitted and received signal vectors, i.e. by finding the minimum value $$\hat{\underline{d}} = \underset{\underline{d} \in C_1 \times \ldots \times C_L}{\operatorname{argmin}} \; \|\underline{r} - \underline{G}\underline{d}\|^2 \quad (34)$$

wherein $\|\cdot\|$ denotes an arbitrary norm, for example an $L_2$ norm and in particular a Euclidean norm.

Equations (33) and (34) may be solved by a brute-force implementation in which all L symbol streams are scanned. That is, taking into account the $M_l$ modulation symbols of the employed modulation schemes $C_l$ all possible values for d in equation (33) are considered resulting in $M_1 \times M_2 \times \ldots \times M_L$ hypothesis or hypothetical values. For example, if $C_1$ and $C_2$ correspond to a 64-QAM modulation alphabet including 64 modulation symbols and the number of data streams (layers) equals two (L=2), a brute-force implementation requires determining 4096 hypotheses.

In the following, the FastML scheme is described in which the number of hypotheses to be determined may be decreased by merely scanning L-1 layers. For each hypothesis on the L-1 layers, an optimal choice for the remaining layer may then be calculated in a further step which is described below. The FastML scheme may at least partly coincide with the ML scheme presented in the above-referenced document of Y. Lomnitz and D. Andelman which is included herein by reference.

The minimization of equation (34) may be expressed as $$\hat{\underline{d}} = \underset{\tilde{\underline{d}} \in C_2 \times \ldots \times C_L}{\operatorname{argmin}} \; s_{\tilde{\underline{d}}}^2 = \underset{\tilde{\underline{d}} \in C_2 \times \ldots \times C_L}{\operatorname{argmin}} \; \|\underline{r} - \tilde{\underline{G}} \tilde{\underline{d}} - g_1 d_1\|^2 \quad (35)$$

wherein $d_1$ denotes the symbol transmitted for the first layer at the base station and $\tilde{d}$ denotes a vector of dimension L-1 including the symbols from the remaining L-1 layers. Further, $g_1$ denotes the first column of the (virtual) channel matrix G and $\tilde{G}$ denotes a matrix including the residual columns 2 to L of the channel matrix G.

An optimal choice for a single transmission antenna may correspond to a Maximum Ratio Combining (MRC) solution in a Maximum Likelihood Sequence Estimation (MLSE) sense. That is, the MLSE of a stream transmitted by a single transmission antenna and received by one or more antennas may be decomposed into a maximal ratio combiner followed by an MLSE decoder. In particular, an ML estimator of a single data symbol from a discrete constellation may be an MRC followed by a slicer. An optimal choice for a single layer thus may be expressed as $$\hat{\underline{d}} = \underset{\underline{d} \in C}{\operatorname{argmin}} \|\underline{r} - g\,\underline{d}\|^2 = \operatorname{slice}[(g^*g)^{-1} g^* \underline{r}] \quad (36)$$

wherein the asterisk denotes the conjugate transpose, g is a complex column vector of dimension $N_{Rx} \times 1$ and the function "slice" may be defined as $$\text{slice}(x) = \underset{d \in C}{\text{argmin}} \|x - d\|^2. \quad (37)$$

Hence, in order to find the solution $\hat{d}$ according to the FastML scheme, all combinations of $\tilde{d}$ are scanned and given a hypothesis on $\tilde{d}$, the minimum value of $s_{\tilde{d}}^2$ or $\|r - \tilde{G}\tilde{d} - g_1 d_1\|^2$ with respect to $d_1$ is obtained by applying equation (36) resulting in $$\hat{d}_1(\tilde{d}) = \underset{d_1 \in C}{\text{argmin}} \|r - \tilde{G}\tilde{d} - g_1 d_1\|^2 \quad (38)$$

$$= \text{slice}[(g_1^* g_1)^{-1} g_1^* (r - \tilde{G}\tilde{d})]$$

This operation is equivalent to subtracting the influence of the hypothesized $\tilde{d}$ from the input and performing MRC and slicing. After calculation of the Euclidean distance for each hypothesis, the value that yields the minimum Euclidean distance is found.

Soft outputs may be calculated e.g. in order to perform soft decoding or turbo decoding. To this end, Log Likelihood Ratios (LLR) may be determined for a number of m bits $b_m$ wherein $m = \log_2(M_1) + \ldots + \log_2(M_L)$ of a number of L $M_l$-ary constellations $C_1, \ldots, C_L$ by $$LLR_m = (s_{min}^{(0)2}(m) - s_{min}^{(1)2}(m)) \frac{1}{\sigma_n^2} \quad (39)$$

with $$s_{min}^{(0)2}(m) - \underset{d \in C_m^{(0)}}{\min}(s_d^2) \text{ and} \quad (40)$$

$$s_{min}^{(1)2}(m) - \underset{d \in C_m^{(1)}}{\min}(s_d^2)$$

wherein the set of constellation points $C_1 \times C_2 \times \ldots \times C_L$ is divided in two equal sets $C_m^{(1)}$ and $C_m^{(0)}$. Each set $C_m^{(1)}$ and $C_m^{(0)}$ comprises all of the combinations of constellation points over L layers, in which $b_m = 1$ or $b_m = 0$, respectively. Note that, by way of example, $C_l \in \{M_{QPSK}, M_{16QAM}, M_{64QAM}\}$ for each layer l with $M_{QPSK}$, $M_{16QAM}$ and $M_{64QAM}$ denoting the complete or partial modulation alphabets of the QPSK, 16QAM and 64QAM modulation schemes, respectively.

With extension of the FastML in the above-referenced document of Y. Lomnitz and D. Andelman, the minimization of equation (34) may be expressed as $$\hat{d} = \underset{\tilde{d} \in C_3 \times \ldots \times C_L}{\text{argmin}} s_{\tilde{d}}^2 = \underset{\tilde{d} \in C_3 \times \ldots \times C_L}{\text{argmin}} \|r - \tilde{G}\tilde{d} - g_1 d_1 - g_2 d_2\|^2 \quad (35)$$

wherein $d_1$ and $d_2$ denote the symbol transmitted for the first and second layer at the base station and $\tilde{d}$ denotes a vector of dimension L-2 including the symbols from the remaining L-2 layers. Further, $g_1$ and $g_2$ denote the first and second column of the (virtual) channel matrix G and $\check{G}$ denotes a matrix including the residual columns 3 to L of the channel matrix G. Instead of using MRC receiver, the SIC receiver with or without blind modulation can be performed to get $d_1$ and $d_2$ on the $r - \check{G}\check{d}$ a with all hypotheses of $\check{d}$.

Returning to FIG. 10, by way of example, FastMLD computation at B4-b on the first subset (i.e. layers 1, b, 2) is used to compute $\hat{d}_b$ and $\hat{d}_2$ in the SIC detection way, e.g. by using the "inner" receiver 100/200 again, on hypothesized $\check{d}$. Here, the $\hat{d}_b$ is based on blind modulation SIC detection and $\hat{d}_2$ is based on normal SIC detection. The $\check{d}$ comprises the layer 1. FastMLD computation at B4-b on the second subset (i.e. layers 2, 1, b) is used to compute $\hat{d}_b$ and $\hat{d}_l$ on hypothesized $\check{d}$, which now comprising the SIC detected layer 2. Thus, if compared to the SIC process shown in FIG. 7, processes A4 and A4', which are used to compute the soft outputs of own layers 1 and 2, are replaced by ML processes B4-a and B4-b.

Thus, the receiver 300, e.g. an SOSIC-FastMLD receiver, may apply a MLD receiver, e.g. FastMLD as explained above, together with the estimated quantization error of the strongest interference layer a (from process B3) to detect the symbols of the own layers 1 and 2. All symbols of own layers 1 and 2 are searched and SIC is used for the other layers.

Figure 11:
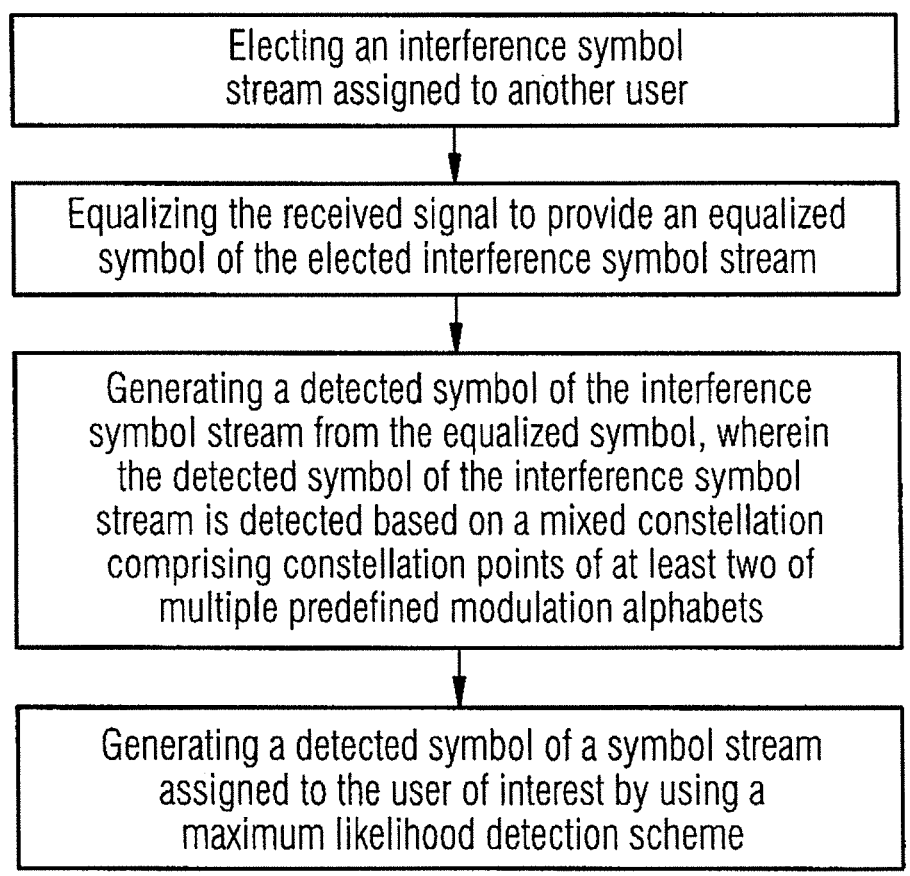
FIG. 11 schematically illustrates a flow diagram of an exemplary method of detecting a received signal comprising multiple symbol streams using a successive interference cancellation process for equalizing at least one interference symbol stream and a maximum likelihood detection scheme for detecting an own symbol stream.

FIG. 11 exemplifies the concept of maximum likelihood symbol detection based on SIC for processing interference layers(s). In accordance with FIG. 11, an exemplary method of detecting a received signal comprising multiple symbol streams may comprise electing an interference symbol stream assigned to another user.

The received signal may be equalized to provide an equalized symbol of the elected interference symbol stream. Equalization may be performed by the inner receiver 100, 200, e.g. using a SIC process. By way of example, the equalization process may use blind modulation quantization error computation as described above.

A detected symbol of the interference symbol stream may then be generated from the equalized symbol, wherein the detected symbol of the interference symbol stream is detected based on a mixed constellation comprising constellation points of at least two of multiple predefined modulation alphabets. Thus, detection of the interference symbol may use the concept of blind modulation detection as described above.

Then, a detected symbol of a symbol stream assigned to the user of interest may be generated by using a maximum likelihood detection scheme. The generation of the detected symbol may be performed by the outer receiver 300 as described above. In particular, the maximum likelihood detection scheme applied by the outer receiver 300 may use (at least) the detected symbol of the interference symbol stream obtained within the prior SIC process as a hypothesis for generating the detected symbol of the symbol stream assigned to the user of interest.

Figure 12:
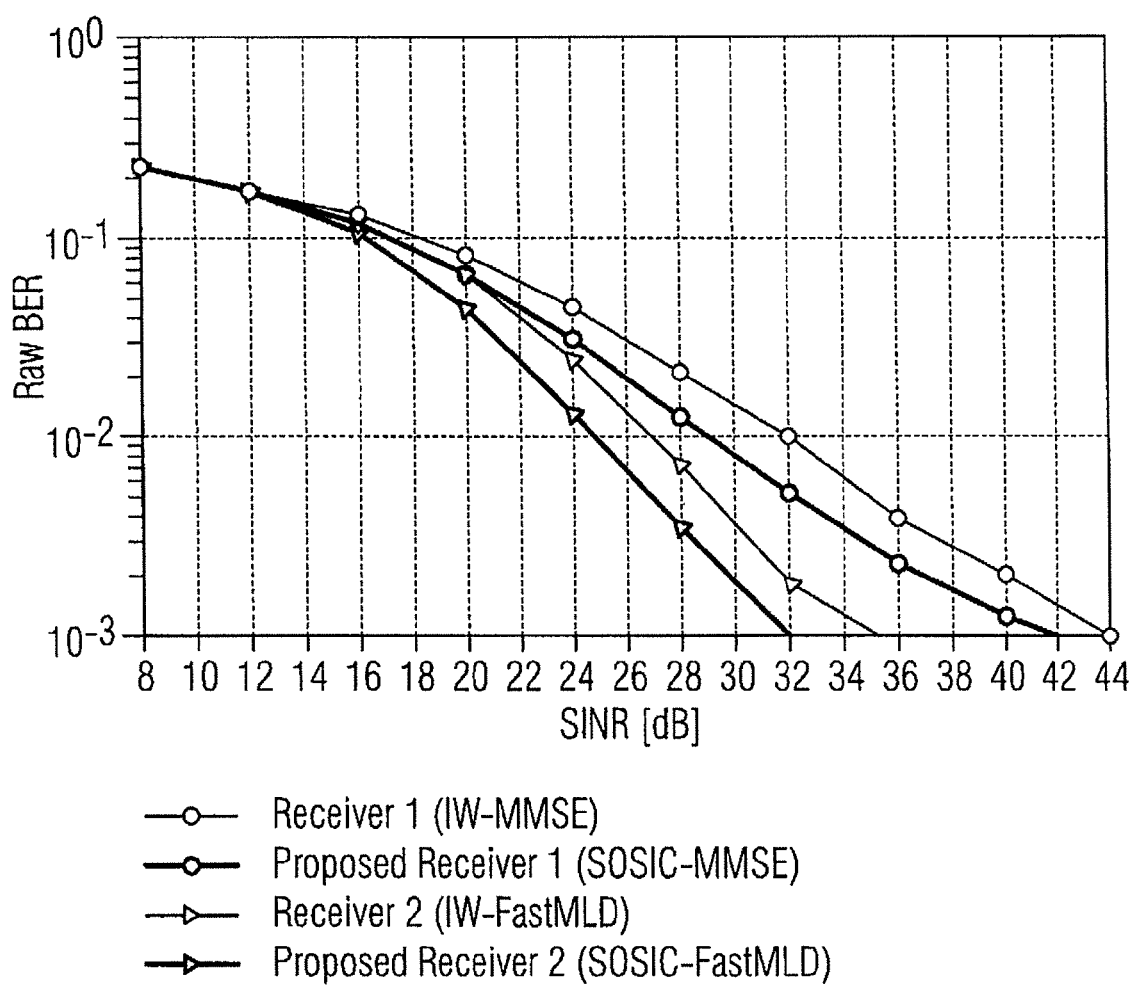
FIG. 12 is a graph illustrating a performance comparison between a successive interference cancellation receiver with blind modulation detection and blind modulation error decision estimation, a corresponding receiver with interference whitening applied to interference symbol streams, a successive interference cancellation receiver with blind modulation detection and blind modulation error decision estimation combined with a maximum likelihood receiver with blind modulation detection and a corresponding receiver with interference whitening applied to interference symbol streams.

FIG. 12 is a graph in which the raw BER (Bit Error Rate) versus SINR (signal to interference and noise ratio) in dB is depicted for four receivers for the purpose of a performance comparison. The four receivers are a successive interference cancellation (SIC) receiver with blind modulation detection and blind modulation error decision estimation ("Proposed Receiver 1 (SOSIC-MMSE)"), a corresponding receiver with conventional interference whitening applied to interference symbol streams ("Receiver 1 (IW-MMSE)"), a successive interference cancellation receiver with blind modulation detection and blind modulation error decision estimation combined with a maximum likelihood receiver with blind modulation detection ("Proposed Receiver 2 (SOSIC-FastMLD)") and a corresponding receiver with conventional interference whitening applied to interference symbol streams ("Receiver 2 (IW-FastMLD)"). The results are obtained from a LTE simulation with TM9. The target UE has 2 own layers. Additional, two further UEs have been considered in TM9 as intra-cell interference. Inter-cell interference has been modeled as well with low interference to noise ratio. The low spatial correlation has been considered as the suitable scenario for ML-MU MIMO transmission with 64Qam modulation. It can be seen that Proposed Receiver 1 (SOSIC-MMSE) is about 3 dB better than corresponding Receiver 1 using conventional interference whitening (IW-MMSE) at raw BER=1%. Furthermore, Proposed Receiver 2 (SOSIC-FastMLD) is about 2 dB better than corresponding Receiver 2 using conventional interference whitening (IW-FastMLD) and about and 7 dB better than Receiver 1 using conventional interference whitening (IW-MMSE) at raw BER=1%. In summary, both proposed receivers significantly outperform corresponding receivers using interference whitening with significantly reduced complexity.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A multi user receiver configured to receive a signal comprising multiple symbol streams assigned to various users, wherein the multiple symbol streams include at least one first symbol stream assigned to a user of the multi user receiver and at least one second symbol stream assigned to another user, wherein a modulation alphabet applied for the at least one second symbol stream is unknown at the multi user receiver, the multi user receiver comprising:
a symbol stream election unit configured to elect a symbol stream of the multiple symbol streams;
an equalizer configured to provide an equalized symbol of the elected symbol stream; and
a detector configured to generate a detected symbol from the equalized symbol based on a constellation, wherein, if the second symbol stream is elected, the constellation used for generating the detected symbol is a mixed constellation comprising constellation points of at least two of multiple predefined modulation alphabets.

2. The receiver of claim 1, wherein, if the second symbol stream is elected, the detector is configured to generate the detected symbol by mapping the equalized symbol to the nearest point of the mixed constellation.

3. The receiver of claim 1, further comprising:
a received signal updating unit configured to update the received signal by subtracting a detected signal based on previously detected symbols from the received signal.

4. The receiver of claim 1, further comprising:
a decision error computation unit configured to compute a quantization error of the detected symbol.

5. The receiver of claim 4, wherein, if the second symbol stream is elected, the decision error computation unit is configured to compute the quantization error of the detected symbol based on a-priori symbol selection probabilities of the multiple predefined modulation alphabets.

6. The receiver of claim 4, wherein the decision error computation unit is configured to compute a covariance matrix related to the elected symbol stream.

7. The receiver of claim 6, wherein the equalizer is configured to provide the equalized symbol of the elected symbol stream based on the covariance matrix related to a previously elected symbol stream.

8. The receiver of claim 1, wherein the symbol stream election unit is configured to elect successive symbol streams, wherein an order of election depends on a signal-to-noise ratio or a signal strength of each symbol stream.

9. The receiver of claim 1, wherein the mixed constellation comprises constellation points of modulation alphabets of different modulation orders.

10. The receiver of claim 9, wherein the mixed constellation comprises constellation points of at least two of QPSK, 16QAM and 64QAM.

11. A multi layer multi user successive interference cancellation (SIC) receiver, comprising:
an equalizer configured to provide equalized symbols of own layers and interference layers;
a detector configured to generate detected symbols from corresponding equalized symbols, wherein detected symbols of interference layers are detected based on a mixed constellation comprising constellation points of at least two of multiple predefined modulation alphabets; and
a covariance matrix computation unit configured to compute a covariance matrix based on a-priori symbol selection probabilities of the multiple predefined modulation alphabets.

12. A method of detecting a received signal comprising multiple symbol streams including at least one first symbol stream assigned to a user of interest and at least one second symbol stream assigned to another user, wherein a modulation alphabet applied for the second symbol stream is unknown, the method comprising:
electing one of the first symbol stream and the second symbol stream;
equalizing the received signal to provide an equalized symbol of the elected symbol stream; and
generating a detected symbol from the equalized symbol based on a constellation, wherein, if the second symbol stream is elected, the constellation used for generating the detected symbol is a mixed constellation comprising constellation points of at least two of multiple predefined modulation alphabets.

13. The method of claim 12, wherein the detected symbol of the second symbol stream is generated by mapping the equalized symbol to the nearest point of the mixed constellation.

14. The method of claim 13, further comprising:
subtracting a detected signal based on previously detected symbols from the received signal to generate an updated received signal; and
performing the method of claim 12 based on the updated received signal.

15. The method of claim 12, further comprising:
computing a quantization error of the detected symbol of the second symbol stream based on a-priori symbol selection probabilities of the multiple predefined modulation alphabets.

16. The method of claim 15, wherein the equalized symbol of the elected symbol stream is based on the quantization error of a detected symbol of a previously elected symbol stream.

17. A method of detecting a received signal comprising multiple symbol streams including at least one first symbol stream assigned to a user of interest and at least one second symbol stream assigned to another user, wherein a modulation alphabet applied for the second symbol stream is unknown, the method comprising:
- electing one of the first symbol stream and the second symbol stream;
- equalizing the received signal to provide an equalized symbol of the elected symbol stream;
- generating a detected symbol from the equalized symbol; and
- computing a quantization error of the detected symbol, wherein, if the elected symbol stream is the second symbol stream, the quantization error is based on a-priori symbol selection probabilities of multiple predefined modulation alphabets.

18. The method of claim 17, further comprising:
- generating the detected symbol from the equalized symbol based on a constellation, wherein, if the elected symbol stream is the second symbol stream, the detected symbol of the second symbol stream is detected from the equalized symbol of the second symbol stream based on a mixed constellation comprising constellation points of at least two of multiple predefined modulation alphabets.

19. The method of claim 17, further comprising:
- computing a covariance matrix relating to the elected symbol stream based on the a-priori symbol selection probabilities of the multiple predefined modulation alphabets.

20. The method of claim 19, further comprising:
- electing a subsequent symbol stream; and
- equalizing the received signal to provide an equalized symbol of the subsequent symbol stream based on the covariance matrix related to the previously elected symbol stream.

21. A multi user receiver of a user of interest, comprising:
- a successive interference cancellation (SIC) receiver comprising:
  - a symbol stream election unit configured to elect an interference symbol stream assigned to another user from a set of symbol streams;
  - an equalizer configured to provide equalized symbols of the interference symbol stream; and
  - a symbol detector configured to generate detected symbols of the interference symbol stream from the equalized symbols, wherein detected symbols of the interference symbol stream are detected based on a mixed constellation comprising constellation points of at least two of multiple predefined modulation alphabets; and
- a maximum likelihood receiver configured to generate detected symbols of one or more symbol streams assigned to the user of interest from a subset of the set of symbol streams and from the detected symbols of the interference symbol stream detected by the symbol detector of the SIC receiver.

22. A method of detecting a received signal comprising multiple symbol streams by a user of interest, the method comprising:
- using a successive interference cancellation (SIC) detection scheme comprising:
  - electing an interference symbol stream assigned to another user;
  - equalizing the received signal to provide an equalized symbol of the elected interference symbol stream; and
  - generating a detected symbol of the interference symbol stream from the equalized symbol, wherein the detected symbol of the interference symbol stream is detected based on a mixed constellation comprising constellation points of at least two of multiple predefined modulation alphabets; and
- using a maximum likelihood detection scheme for:
  - generating a detected symbol of a symbol stream assigned to the user of interest from a subset of the set of symbol streams and from the detected symbol of the interference symbol stream detected by using the SIC scheme.

23. The multi user receiver of claim 21, wherein the interference symbol stream is not comprised in the subset of the set of symbol streams used for maximum likelihood detection.

24. The method of claim 22, wherein the interference symbol stream is not comprised in the subset of the set of symbol streams used for maximum likelihood detection.

* * * * *